Sept. 9, 1941.       E. J. BRUSELL       2,255,149
EYEGLASS
Filed July 18, 1938

Inventor
Ernest J. Brusell

By

Attorney

Patented Sept. 9, 1941

2,255,149

UNITED STATES PATENT OFFICE 2,255,149

EYEGLASS

Ernest J. Brusell, St. Paul, Minn.

Application July 18, 1938, Serial No. 219,781

1 Claim. (Cl. 88—47)

My invention relates to an improvement in eyeglasses wherein it is desired to provide a means of supporting the lenses which is simple to construct and which presents an attractive appearance.

During the past few years much attention has been given to the construction of eyeglass frames for supporting lenses. Some of these frames have been formed of a channel shape to removably support the lenses therein. Other frames have been constructed which support the lenses entirely from the top edge. In all of these types of construction, the idea of providing more area through which the person using the glasses may see properly, has been carefully considered and the appearance and design have also been considered of importance.

It is a purpose of the present invention to provide glasses having frames capable of supporting the lenses by engagement therewith over a relatively small portion of the circumference of the lenses and to form this construction very simply to enable the frame to be constructed at a minimum of cost, and to be attached with a minimum of effort.

It is a purpose of my invention to engage both surfaces of the lens along a relatively short portion of the periphery of the lens in order to engage the lens at spaced points along one edge of the same. The manner in which the frame is constructed to engage both surfaces of the lens forms an important feature of my invention.

These and other objects and novel features of my invention will be more clearly and fully set forth in the following specification and claim.

In the drawing forming a part of my specification:

Figure 1:
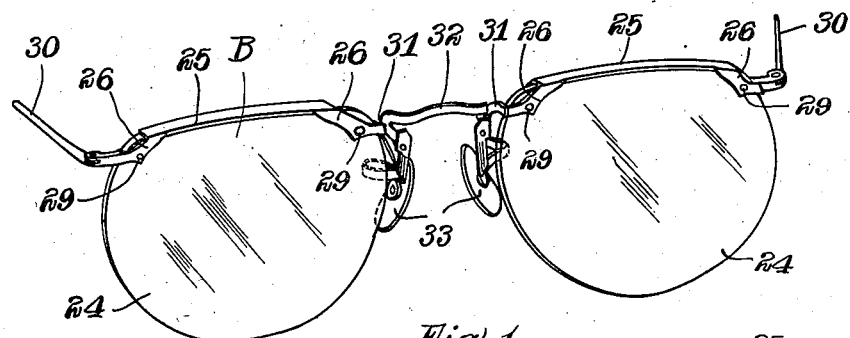
Figure 1 is a perspective view of one form of construction of glasses.
Figure 2:
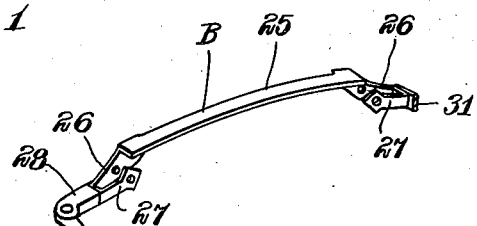
Figure 2 is a perspective view of a portion of the frame illustrated in Figure 1, the lens having been removed.

The glasses B illustrated in Figures 1 and 2 include lenses 24 supported from supporting straps 25 which overlie the upper edge of the lenses. At each end of the strap 25 an arm 26 extends downwardly and outwardly over the front surface of the lens. This arm is bent to overlie the edge of the lens and then is bent to form a portion 27 which is parallel to the body of the arm 26. In other words, the arm forms a yoke between the sides of which the lens 24 may be inserted. The construction of this frame is perhaps best illustrated in Figure 2 of the drawing, in which the arms 26 are shown formed to provide the parallel arm portion 27. Screws or any other suitable fastening means 29 extend through the arms 26 and the parallel portions thereof 27, to secure the lenses 24 to the frame straps 25. At the outer edge of each lens a bow supporting bracket 28 may be secured to the portion of the arm 26 overlying the edge of the lens, and a bow 30 may be pivoted to this bow supporting bracket. At the inner edge of each lens the bridge supporting strap 31 is attached which is designed to support the bridge 32 and the nose rests 33.

It will be seen that the end portions 27 of the arms 26 bend to provide the proper width between the body of the arm 26 and the end 27 thereof, so that any thickness of lens may be accommodated. The provision of the arms 26 acts to provide a means whereby the fastening screws or other means 29 may be positioned at a point considerably spaced from the edge of the lens so that the lenses will be securely held in place.

Figure 3:
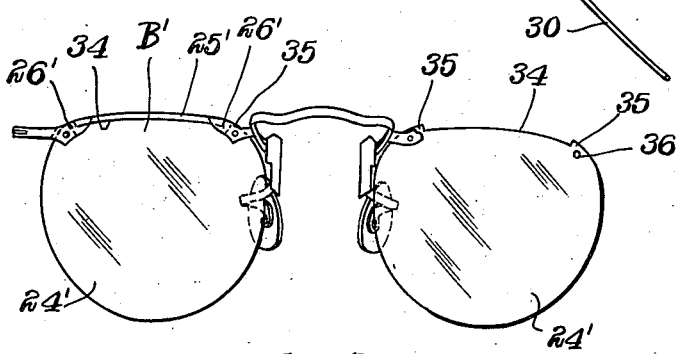
Figure 3 is a front elevation view of a type of construction similar to that shown in Figures 1 and 2, part of the frame being broken away to disclose the construction of the lens.

In Figure 3 of the drawing, I illustrate a type of glasses B' which is identical with those illustrated in Figures 1 and 2, with the exception that the lenses 24' are provided with a groove 34 or cut-away portion along the top edge thereof into which the supporting frame straps 25' may extend. Obviously when the straps 25' are recessed into the notches or cut-away portions 34, the portions 35 of the lenses 24' extend flush with the top edge of the straps 25'. Thus the glasses B' are slightly more graceful in appearance than the glasses B, and the straps 26' need not extend into the body of the glass from the strap 25' as do the arms 26 for the reason that the portions of the lens 24' which are not cutaway, provide sufficient area about the openings 36 to provide the desired strength of construction.

Figure 5:
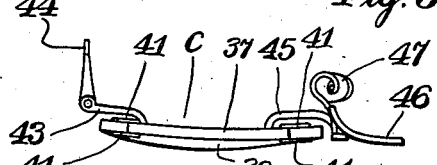
Figure 5 is a top plan view of the frame illustrated in Figure 4.
Figure 4:
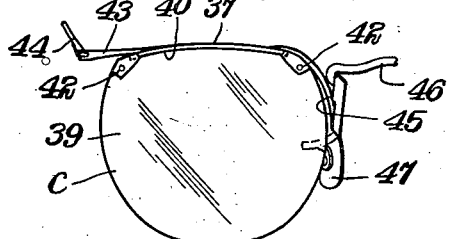
Figure 4 is a front elevational view of a portion of a frame of slightly modified form.

The glasses C illustrated in Figures 4 and 5 are somewhat similar to the glasses B. The glasses C include a frame strap 37 overlying the top edge of the lens 39 or else positioned in a cutaway portion therein as illustrated. This cutaway portion 40 is similar to the cut-away portion 34 clearly illustrated in Figure 3 of the drawing, and permits the top of the strap 37 to be flush with the adjacent portions of the lens 39. Extending on each side or surface of the lenses 39 on each end of each frame strap 37, I provide a lip 41 which is designed to provide a means of attachment between the strap 37 and the lens. Screws or rivets 42 extend through opposed lips 41 and through the lens 39 to hold the lenses 39 securely to the frame straps 37.

Extending inwardly from the rear surface of the frame strap 37, I provide a bracket 43 which extends beyond the end of the lens to pivotally support a bow 44. Near the opposite end of the strap 37, I provide a bracket 45 which is connected to the bridge 46 and to the nose rests 47 to connect these parts in proper relationship.

In accordance with the patent statutes I have described the principles of construction of my eyeglasses, and while I have endeavored to set forth the best embodiments thereof, I desire to have it understood that these are only illustrative of a means of carrying out my invention and that obvious changes may be made within the scope of the following claim without departing from the spirit of my invention.

I claim:

Eyeglasses comprising spaced lenses each having a thin, elongated notch in the upper edge thereof, terminating in end shoulders, an elongated thin frame strap in each said notch extending longitudinally between said shoulders, ears on each end of each said frame strap projecting beyond the ends of said frame straps and overlying both of the opposed lens surfaces to hold said straps in place in said notches, means beyond the ends of said straps extending through the lenses connecting said ears to hold the ends of said straps to said lenses, brackets secured to the rear surface of said frame straps near the outer ends thereof, and bows secured to said brackets.

ERNEST J. BRUSELL.